United States Patent
Friesen et al.

(10) Patent No.: US 12,280,826 B2
(45) Date of Patent: Apr. 22, 2025

(54) SUBFRAME FOR A VEHICLE, IN PARTICULAR AN ELECTRIC VEHICLE

(71) Applicant: Autotech Engineering S.L., Amorebieta-Etxano (ES)

(72) Inventors: Viktor Friesen, Bielefeld (DE); Denis Geßner, Bielefeld (DE)

(73) Assignee: Autotech Engineering S.L., Amorebieta-Etxano (ES)

( * ) Notice: Subject to any disclaimer, the term of this patent is extended or adjusted under 35 U.S.C. 154(b) by 0 days.

(21) Appl. No.: 18/216,664

(22) Filed: Jun. 30, 2023

(65) Prior Publication Data

US 2024/0001993 A1    Jan. 4, 2024

(30) Foreign Application Priority Data

Jul. 1, 2022    (EP) .................................... 22382629

(51) Int. Cl.
| B62D 21/15 | (2006.01) |
| B62D 21/00 | (2006.01) |
| B62D 21/11 | (2006.01) |

(52) U.S. Cl.
CPC ........... B62D 21/155 (2013.01); B62D 21/00 (2013.01); B62D 21/11 (2013.01); *B60G 2206/0114* (2013.01); *B60G 2206/60* (2013.01)

(58) Field of Classification Search
CPC ...... B62D 21/155; B62D 21/11; B62D 21/00; B62D 27/04; B62D 27/065; B60G 2206/60; B60G 2206/0114; B60G 2204/15

See application file for complete search history.

(56) References Cited

U.S. PATENT DOCUMENTS 4,723,791 A * 2/1988 Miura ...................... B60G 7/02
                                              267/257
5,074,374 A * 12/1991 Ohtake ................... F16F 15/04
                                              180/300

(Continued)

FOREIGN PATENT DOCUMENTS

DE    102012021562 A1    5/2014
DE    102012111461 A1    5/2014

(Continued)

*Primary Examiner* — Timothy Wilhelm
(74) *Attorney, Agent, or Firm* — The Webb Law Firm

(57) ABSTRACT

The invention relates to a subframe, in particular front axle subframe, for a vehicle, in particular electric vehicle, having a first shell element and a second shell element which is rigidly connected to the first shell element and defines a cavity therewith. At least one of the shell elements has a side wall which, as an outer wall of the subframe, is connected to the other shell element or to another of the shell elements in a materially bonded manner having at least one bushing-like or sleeve-like spacer element for the insertion of a fastening bolt, preferably a screw bolt, for connecting to a body or component. The spacer element is arranged at one of its ends at a through-hole of the first shell element and extending inside the cavity in the direction of a through-hole of the second shell element. In order for the subframe to provide greater stability, in particular improved safety against failure of weld seams at the body connection and/or component connection, e.g. transverse bridge connection, with less or only slightly increased weight, the invention provides that the side wall of the shell element has at least one tab which is welded to the spacer element. This allows at least one additional load path to be implemented in a direction parallel to the longitudinal center axis of the spacer element.

14 Claims, 3 Drawing Sheets

(56) References Cited

U.S. PATENT DOCUMENTS

| | | | | |
|---|---|---|---|---|
| 5,280,957 | A * | 1/1994 | Hentschel | B62D 3/12 |
| | | | | 280/124.109 |
| 5,580,028 | A * | 12/1996 | Tomczak | B62D 27/04 |
| | | | | 267/293 |
| 5,833,026 | A * | 11/1998 | Zetterstrom | B60G 3/202 |
| | | | | 280/124.135 |
| 5,862,877 | A * | 1/1999 | Horton | B60G 99/004 |
| | | | | 280/798 |
| 5,879,026 | A * | 3/1999 | Dostert | B60G 99/004 |
| | | | | 180/311 |
| 6,149,197 | A * | 11/2000 | Ishii | B60G 7/02 |
| | | | | 280/788 |
| 6,402,172 | B1 | 6/2002 | Suzuki | B62D 25/08 |
| | | | | 280/124.109 |
| 6,428,046 | B1 * | 8/2002 | Kocer | B62D 21/11 |
| | | | | 180/311 |
| 6,866,295 | B2 * | 3/2005 | Ziech | B60G 11/28 |
| | | | | 280/124.109 |
| 6,997,276 | B2 * | 2/2006 | Yoshida | B62D 21/11 |
| | | | | 180/312 |
| 7,380,829 | B2 * | 6/2008 | Kishima | B62D 21/155 |
| | | | | 296/187.03 |
| 7,445,243 | B2 * | 11/2008 | Park | B62D 21/11 |
| | | | | 280/124.109 |
| 7,461,850 | B2 * | 12/2008 | Kurth | B62D 21/155 |
| | | | | 280/124.109 |
| 7,926,846 | B2 * | 4/2011 | Tanaka | B60G 7/02 |
| | | | | 280/781 |
| 8,025,313 | B2 * | 9/2011 | Tanaka | B62D 21/11 |
| | | | | 180/311 |
| 8,402,878 | B2 * | 3/2013 | Schreiner | F41H 5/026 |
| | | | | 89/918 |
| 8,484,930 | B2 * | 7/2013 | Ruehl | B62D 21/09 |
| | | | | 52/843 |
| 8,579,308 | B2 * | 11/2013 | Weeks | B60G 3/20 |
| | | | | 280/124.109 |
| 8,740,231 | B2 * | 6/2014 | Shibaya | B62D 21/11 |
| | | | | 280/124.109 |
| 8,746,718 | B2 * | 6/2014 | Otani | B60G 7/02 |
| | | | | 280/124.109 |
| 8,925,942 | B2 * | 1/2015 | Buschjohann | B62D 29/005 |
| | | | | 280/124.109 |
| 9,108,681 | B2 * | 8/2015 | Imanishi | B62D 29/008 |
| 9,221,317 | B1 * | 12/2015 | Li | B62D 27/06 |
| 9,254,872 | B2 * | 2/2016 | Otani | B62D 21/155 |
| 9,266,563 | B1 * | 2/2016 | Han | B62D 21/00 |
| 9,403,558 | B1 * | 8/2016 | Pohl | B62D 21/11 |
| 9,469,344 | B2 * | 10/2016 | Haselhorst | B62D 21/11 |
| 9,505,437 | B2 * | 11/2016 | Leibl | B62D 21/03 |
| 9,505,438 | B2 * | 11/2016 | Zander | B62D 21/11 |
| 9,540,046 | B2 * | 1/2017 | Kramer | B60G 11/181 |
| 9,937,961 | B2 * | 4/2018 | Lee | B29C 70/80 |
| 9,969,440 | B2 * | 5/2018 | Kurokawa | B62D 27/023 |
| 10,118,643 | B2 * | 11/2018 | Komiya | B62D 21/11 |
| 10,391,828 | B2 * | 8/2019 | Jager | B62D 21/11 |
| 10,501,123 | B2 * | 12/2019 | Svacha | B62D 33/077 |
| 10,549,783 | B2 * | 2/2020 | Haselhorst | B62D 21/11 |
| 10,676,133 | B2 * | 6/2020 | Komiya | B62D 21/11 |
| 11,066,110 | B2 * | 7/2021 | Tanaka | B62D 27/023 |
| 11,161,407 | B2 * | 11/2021 | Coffman | B62D 65/10 |
| 11,814,100 | B2 * | 11/2023 | Waghmare | B62D 21/11 |
| 2005/0212334 | A1 * | 9/2005 | Murata | B62D 21/11 |
| | | | | 296/204 |
| 2006/0049603 | A1 * | 3/2006 | Katagiri | B62D 21/11 |
| | | | | 280/124.109 |
| 2007/0107368 | A1 * | 5/2007 | Ruehl | E04C 3/07 |
| | | | | 52/843 |
| 2013/0181476 | A1 * | 7/2013 | Naoi | B62D 35/02 |
| | | | | 296/180.1 |
| 2013/0241186 | A1 * | 9/2013 | Shibaya | B62D 21/00 |
| | | | | 280/781 |
| 2013/0285416 | A1 * | 10/2013 | Fukushi | B62D 25/20 |
| | | | | 296/204 |
| 2015/0217808 | A1 * | 8/2015 | Haselhorst | B62D 21/11 |
| | | | | 280/124.109 |
| 2015/0375788 | A1 * | 12/2015 | Yun | F16F 1/3842 |
| | | | | 267/292 |
| 2016/0221606 | A1 | 8/2016 | Irle et al. | |
| 2018/0265135 | A1 * | 9/2018 | Komiya | B60R 19/34 |
| 2019/0023322 | A1 * | 1/2019 | Haselhorst | B62D 21/11 |

FOREIGN PATENT DOCUMENTS

| | | |
|---|---|---|
| DE | 102013108695 A1 | 2/2015 |
| EP | 2902303 A1 | 8/2015 |
| EP | 3434562 B1 | 9/2019 |
| WO | 2022064116 A1 | 3/2022 |
| WO | 2022073818 A1 | 4/2022 |

* cited by examiner

SUBFRAME FOR A VEHICLE, IN PARTICULAR AN ELECTRIC VEHICLE

CROSS-REFERENCE TO RELATED APPLICATION

This application claims priority to European Patent Application No. 22382629.8 filed Jul. 1, 2022, the disclosure of which is hereby incorporated by reference in its entirety.

BACKGROUND OF THE INVENTION

Field of the Invention

The invention relates to a subframe, in particular a front axle subframe, for a vehicle, in particular an electric vehicle, having a first shell element and a second shell element which is rigidly connected to the first shell element and defines a cavity with the latter.

Description of Related Art

Such subframes, also referred to as axle beams, are known in many embodiments (see, e.g., DE-A1-10 2012 021 562 and DE-A1-10 2012 111 461). They are intended to be as light as possible while maintaining high strength and rigidity, and usually comprise link connections (bearing mounts) for wheel guide elements and other assemblies to enable the installation of complete front or rear axle modules with drive units as a pre-assembly unit.

Electric motors of electric vehicles can already deliver their maximum torque when the vehicle is at a standstill and therefore, unlike a vehicle drive with an internal combustion engine, do not usually require a gear box. The high starting torques of electric vehicles require particularly stable subframe structures to which the electric motors are attached, for example by means of a transverse bridge. If, as in conventional subframes for vehicles with internal combustion engines, sheet-metal elements of the subframe, e.g. upper shells, were installed with conventional sheet thicknesses of e.g. approx. 2.2 mm, the subframe would fail due to excessive bending stresses in the area of the transverse bridge connection. To rule out such component failure, it is known from practice to increase the sheet thickness of the sheet metal shells, especially the top shells. However, the resulting increase in material usage leads to a considerable increase in the weight of the subframe. Due to the relatively low energy density offered by a rechargeable traction battery (accumulator) compared with a fuel-filled tank, electric vehicles are generally significantly heavier than corresponding vehicles with internal combustion engines. High vehicle weights result in high effective and dynamic axle loads, which in turn lead to increased chassis wear.

EP-B1-3 434 562 discloses a subframe, in particular for an electric vehicle, comprising a first shell element and a second shell element which is rigidly connected to the first shell element and defines a cavity therewith. Furthermore, the subframe comprises a transverse bridge for supporting a vehicle drive unit, in particular a vehicle drive motor or transmission, which is connected to the first shell element and the second shell element by a screw connection, and a sleeve-like spacer element for passing through a screw for the body connection, the spacer element being arranged at one of its ends at a through-hole of the first shell element and extending inside the cavity in the direction of a through-hole of the second shell element. In order for such a subframe to have significantly greater stability, in particular greater flexural strength, with the same or only slightly increased weight, it is proposed in EP-B1-3 434 562 that the spacer element has a sleeve-like section for receiving a screw of the screw connection of the transverse bridge. In this case, the spacer element is preferably loop-shaped.

The subframe disclosed in EP-B1-3 434 562 has proven itself well in practice. However, tests have shown that when the subframe is subjected to dynamic axle loads, high stresses sometimes occur in the region of the body connection and/or the transverse bridge connection which, in unfavorable cases, can lead to failure of the welds connecting a sleeve-like spacer element to the shell elements.

SUMMARY OF THE INVENTION

On this basis, the present invention is based on the object of creating a subframe of the type mentioned at the outset which, with lower or only slightly increased weight, offers greater stability, in particular improved safety against failure of weld seams at the body connection and/or a component connection, e.g. transverse bridge connection.

This object is solved by a subframe having the features as described herein. Advantageous embodiments of the subframe according to the invention are indicated in the subclaims.

The subframe according to the invention is composed of at least two shell elements. In particular, it comprises a first shell element and a second shell element which is rigidly connected to the first shell element and defines a cavity therewith. At least one of the shell elements has a side wall that is materially bonded to the other shell element or to another of the shell elements as an outer wall of the subframe. Furthermore, the subframe comprises at least one bushing-like or sleeve-like spacer element for insertion of a fastening bolt, preferably a screw bolt, for body or component connection. In this case, the spacer element is arranged at one of its ends on a through-hole of the first shell element and extends inside the cavity in the direction of a through-hole of the second shell element. The component connection may be, for example, a transverse bridge connection, a transmission bridge connection, or a steering gear housing connection. According to the invention, the subframe is characterized in that the side wall of the shell element has at least one tab which is welded to the bushing-like or sleeve-like spacer element.

The spacer element constitutes a reinforcement of the subframe. It may therefore also be referred to as a bushing-like or sleeve-like reinforcing element. Further, the spacer element may also be referred to simply as a sleeve or bushing.

By the fact that the side wall of the shell element, which as an outer wall of the subframe is materially bonded to the other shell element or to another of the shell elements, has at least one tab which is welded to the bushing-like or sleeve-like spacer element, an additional load path can be implemented in a direction parallel to the longitudinal center axis of the spacer element, which provides greater stability, in particular improved safety against failure of weld seams at the body connection and/or component connection. Since the tab can be integrated for this purpose in a side wall of one of the shell elements that is provided anyway or is required on a regular basis, the additional load path can be implemented without the need for a reinforcing web that was previously manufactured separately. The integration of the tab in a side wall of one of the shell elements, preferably a top shell, allows an optimized use of the material of the shell elements and thus a weight saving.

The subframe according to the invention is thus characterized by improved safety against failure of weld seams at the body connection and/or component connection, with lower or only slightly increased weight.

The shell elements of the subframe are preferably made of sheet metal, for example sheet steel. Sheet metal, in particular sheet steel, offers very good strength properties at relatively low material costs. It can be shaped into complex geometries and is also easy to cut and weld. Advantageously, the first shell element and/or the second shell element of the subframe can be made from high-strength or press-hardenable sheet steel, for example manganese-boron steel. Such sheet steel is characterized by particularly high flexural strength and tensile strength at low weight.

Preferably, the first shell element and the second shell element of the subframe have a different sheet thickness and/or a different steel composition. If the subframe has a transverse bridge, the shell element directly accommodating (supporting) the transverse bridge has, for example, a smaller sheet thickness than the other shell element rigidly connected thereto.

A further advantageous embodiment of the invention provides that the shell element having the tab is an upper shell of the subframe. This embodiment is advantageous from a manufacturing point of view. In particular, this embodiment offers the advantage of keeping the number of shell elements as separately manufactured individual parts for executing the subframe relatively low. Accordingly, the number of necessary welded joints, in particular weld seams, for connecting the shell elements can be kept low.

According to a further advantageous embodiment of the invention, the shell element having the tab has a further side wall which is integrally connected, i.e. in one piece, to the side wall having the tab via a web, the two side walls defining with the web a shell section which is U-shaped in cross section. In this way, the stability, in particular the flexural strength, of the relevant shell element and thus of the subframe can be increased for a given or reduced weight.

In this connection, a further embodiment of the invention provides that the web of the shell element connecting the side walls to one another has a window-like recess, the recess having a clear size which is larger than the outer side surface of the tab. Preferably, the clear size of the recess is at least 1.5 times, and more preferably at least 2 times, the outer side surface of the tab. This recess allows the weight of the relevant shell element and thus of the subframe to be significantly reduced, while the tab welded to the spacer element offers greater stability, in particular improved safety against failure of weld seams at the body connection and/or component connection.

A further advantageous embodiment of the invention is characterized in that the subframe comprises at least two bushing-like or sleeve-like spacer elements, one of the spacer elements being intended for the insertion of a fastening bolt, preferably a screw bolt, to the body connection, while another of the spacer elements is intended for the insertion of a fastening bolt, preferably screw bolt, for a component connection, for example a transverse bridge connection or a transmission bridge connection, and wherein the side wall of the shell element has at least two tabs, one tab of which is welded to the spacer element of the body connection and another of the tabs is welded to the spacer element of the component connection. The at least two tabs allow at least two additional load paths to be implemented in the direction parallel to the longitudinal center axis of the respective spacer element. This makes it possible to improve safety against failure of weld seams both at the body connection and at the component connection.

According to a further advantageous embodiment of the invention, the respective tab is welded to the respective spacer element by a weld seam, preferably a fillet weld, extending substantially parallel to a longitudinal central axis of the bushing-like or sleeve-like spacer element, the longitudinal central axis of the spacer element in the assembled state of the subframe preferably extending substantially parallel to the vertical axis (z-axis) of the subframe. Such a weld seam is relatively easy to realize in terms of production technology and considerably reduces the load on a weld seam which is or will be executed at the head of the spacer element intended for the body connection or component connection.

For a significant reduction in the load on the weld seam at the head of the spacer element intended for the body connection or component connection, it is advantageous if, according to a further embodiment of the invention, the welded connection between the tab and the spacer element extends over an axial length of the spacer element which is in the range from 20 to 95%, preferably in the range from 50 to 95%, particularly preferably in the range from 60 to 90%, of the distance of the shell elements from each other measured at the spacer element.

A further advantageous embodiment of the invention provides that the spacer element and the tab welded thereto are arranged in oblique abutment with respect to each other. In this case, the weld joining the tab and the spacer element can be realized relatively easily at the fillet defining an obtuse angle of the elements to be welded. Such a fillet should be readily accessible to a welding head in most cases.

The at least one bushing-like or sleeve-like spacer element of the subframe according to the invention may be connected to at least one of the shell elements in various ways. In this regard, an advantageous embodiment of the invention provides that the at least one spacer element is connected on at least one of its ends or front faces to at least one of the shell elements by a plug-in connection or clamp connection and/or by a welded connection at the end or face.

Particularly in terms of production technology, it is advantageous if, according to a preferred embodiment of the invention, the respective tab is formed integrally with the side wall of the shell element.

According to a further embodiment of the invention, the respective tab is bent inwardly relative to an outer surface or tangential plane defined by the side wall of the shell element in the direction of the spacer element welded thereto.

A further advantageous embodiment of the invention provides that the tab merges into the side wall via a bending region, wherein there is at least one free cut in the side wall and/or on the tab which extends into the side wall beyond the bending region. This embodiment allows a high degree of freedom for shaping the tab and ensures a high load stability of the tab, in particular at its transition into the side wall.

According to a further embodiment of the invention, a recess is formed between the tab of one shell element and the other shell element and extends to the end of the tab welded to the spacer element. This recess makes it possible to avoid weld buildup on the spacer element. Since residual stresses are generated during welding as a result of shrinkage, it is advantageous for high weld seam quality to avoid a weld seam buildup. Furthermore, this embodiment allows dirt and/or moisture pockets to be avoided in the area of the body connection or component connection. In this connection, a preferred embodiment is characterized in that the recess extends into the side wall starting from the end of the tab welded to the spacer element up to the bending region of the tab or beyond the bending region of the tab.

A further advantageous embodiment of the invention provides that the spacer element has a diameter-widened head in the form of a perforated disc, preferably a toothed disc, the head being formed integrally with the spacer element. This simplifies the assembly of the spacer element. In particular, it is advantageous if the head of the spacer element is welded directly to the relevant shell element according to a further embodiment. This optimizes the reinforcing effect of the spacer element, in particular if the welded joint between the head of the spacer element and the shell element is designed as an annular or substantially circumferential weld. By designing the head of the spacer element in the form of a toothed disc, a non-slip connection of the subframe to the body can be ensured, without excessively increasing the component weight of the body connection. The toothed structure (toothing) of the toothed washer increases the coefficient of friction between the subframe and the attached body and thus contributes to the non-slip connection of the subframe.

In a preferred embodiment of the invention, the first shell member has a first sidewall and the second shell member has a second sidewall, wherein the first sidewall is bonded to the second shell member and the second sidewall is bonded to the first shell member. Such an embodiment may contribute to improved mechanical properties of the subframe.

Preferably, the first and second side walls are formed in particular as an outer wall of the subframe, wherein both a first tab of the first side wall of the first shell element and a second tab of the second side wall of the second shell element are welded to a spacer element, preferably to the same spacer element. This has proved to be advantageous in particular when long spacer elements are used.

BRIEF DESCRIPTION OF THE DRAWINGS

In the following, the invention will be explained in more detail with reference to a drawing illustrating several embodiments. It shows.

DESCRIPTION OF THE INVENTION

Figure 1:
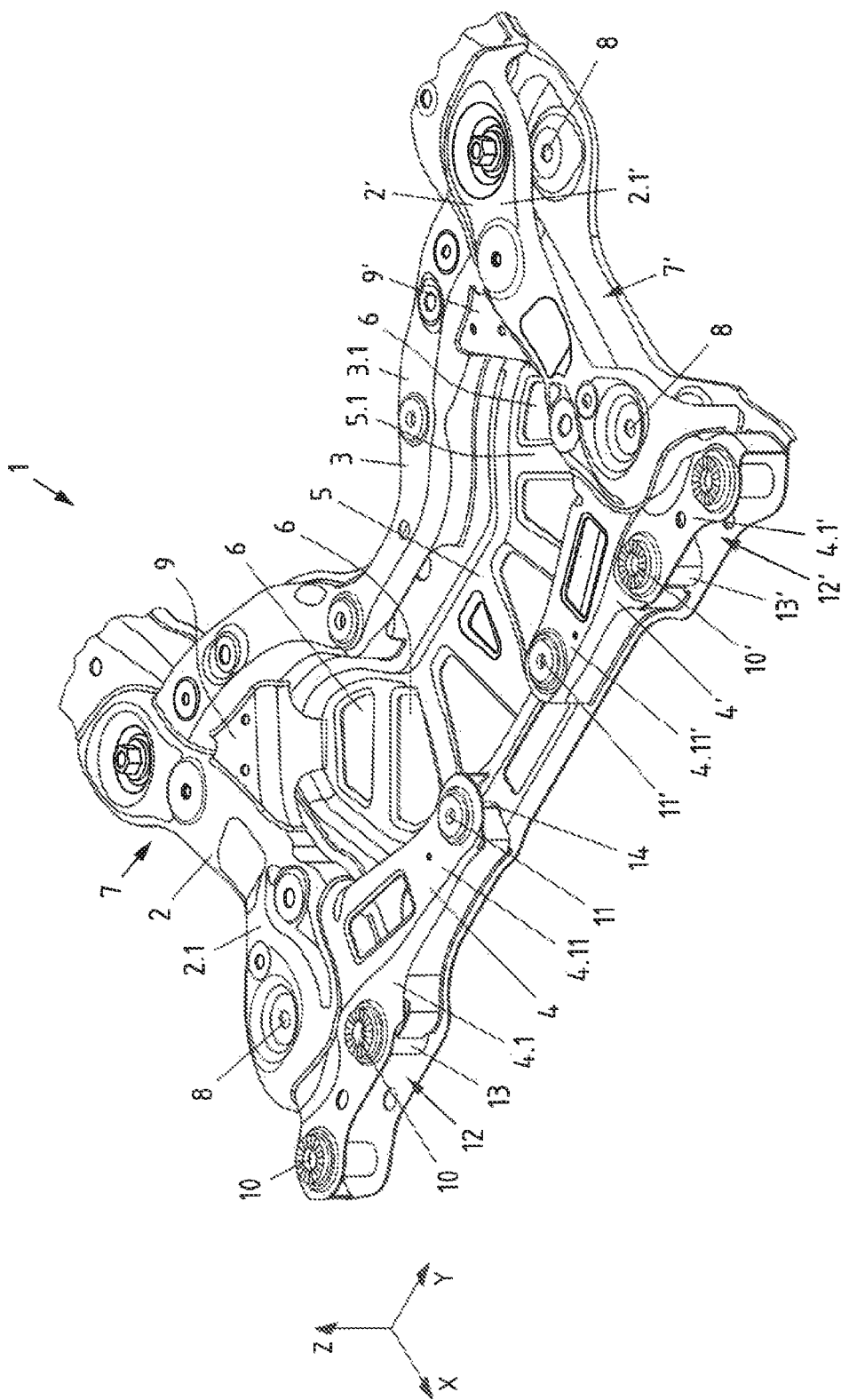
FIG. 1 a section of a subframe for a vehicle, in particular an electric vehicle, in a perspective view.

In FIG. 1, a section of a subframe 1 for a vehicle, in particular an electric vehicle, is shown. The subframe 1, which is designed here for example as a front axle subframe, is composed of longitudinal members 2, 2' and cross members 3, 4, 4'. The term "longitudinal members" is understood here to mean supporting elements or sections of supporting elements of the subframe 1 which, in the assembled state of the subframe 1, extend essentially along the longitudinal axis of the motor vehicle in question. In contrast, the cross members 3, 4, 4' extend substantially horizontally and transversely to the longitudinal axis of the motor vehicle in the assembled state of the subframe 1.

FIG. 1 shows rear sections of two longitudinal members 2, 2' and a cross member 3 connecting the longitudinal members to one another. The longitudinal members 2, 2' and the cross members 3, 4, 4' are formed from shell elements, specifically from sheet metal shells. The subframe 1 is constructed, for example, from a lower shell element 5 and a plurality of upper shell elements 2.1, 2.1', 3.1, 4.1, 4.1'. The lower shell element 5 may also be referred to as the lower shell or main shell. It comprises a shell area 5.1 having recesses 6, which can function as a steering guard, for example. A number of upper shell elements 2.1, 2.1', 3.1, 4.1, 4.1' are arranged on the lower shell element 5, which are welded to the lower shell element 5 and partially to each other. The upper shell elements 2.1, 2.1', 3.1, 4.1, 4.1' can also be referred to as upper shells. The shell elements 2.1, 2.1', 3.1, 4.1, 4.1', 5 are preferably made of sheet steel and preferably have different sheet thicknesses and/or different material grades, in particular yield strengths and tensile strengths. For example, the upper shell element (top shell) 4.1, 4.1' can have a lower sheet thickness than the lower shell element 5.

The lower shell element 5 and the upper shell elements 2.1, 2.1' of the longitudinal members 2 and 2' welded thereto define a left receptacle 7 and a right receptacle 7' for connecting chassis control arms (transverse control arms) (not shown here). The connection of the chassis control arms is carried out by means of bolted joints. For this purpose, connection holes 8 for bolts are formed in the shell elements 2.1, 2.1' and 5. Reinforcing plates 9 and 9' are welded into corner areas bounded by the shell elements 2.1, 2.1', 3.1 of the side members 2, 2' and of the cross member 3 and are, for example, essentially angular when viewed in cross section.

Additional upper shell elements (upper shells) 4.1, 4.1' are attached to the body-side ends of the upper longitudinal member shell elements 2.1, 2.1', which have through-holes 10, 10' for receiving bolts for connecting the subframe 1 to the body of the vehicle in question. Furthermore, these upper shell elements 4.1, 4.1' may each have a section 4.11, 4.11' which extends transversely inwards from the inner side of the longitudinal member 2, 2' over a certain extent. The upper shell elements 4.1, 4.1' or the sections 4.11, 4.11' end at a distance from one another. Through holes 11, 11' are formed at the facing ends of the shell elements 4.1, 4.1' and sections 4.11, 4.11', respectively, for receiving screws for connecting a component, for example a transverse bridge of the subframe. The transverse bridge (not shown) can serve to support a vehicle drive unit, for example an electric motor. Alternatively, however, another component, for example a steering gear housing, an internal combustion engine or a transmission to be coupled to a drive unit, can be mounted at the through holes 11, 11'.

The subframe 1 thus has, in a section which serves for connection to the body of the vehicle and/or for connection of a component, for example a transverse bridge, a first shell element 4.1, 4.1' and at least one second shell element 5 which is rigidly connected, preferably welded, to the first shell element 4.1, 4.1' and defines a cavity 12, 12' therewith. The through-holes 10, 10', 11, 11' of the shell elements 4.1, 4.1' are each provided with a bushing-like or sleeve-like spacer element 13, 13', 14, into which a fastening bolt (not shown), preferably a screw bolt, can be inserted for connecting the body or component.

The spacer element 13, 13', 14 is thereby arranged at one of its ends at a through hole 10, 10', 11, 11' of the first shell element 4.1, 4.1' and extends inside the cavity 12, 12' in the direction of a through hole of the second shell element 5.

The spacer element 13, 13', 14 is connected to at least one of the shell elements 4.1, 4.1' or 5 by means of a plug-in or clamp connection and by means of an end-side or front-end welded connection 16, 17. The spacer element 13, 13', 14 is provided with a diameter-extended head 13.1, 14.1 in the form of a pierced disc. Preferably, the head 13.1, 14.1 is formed integrally with the spacer element 13, 14. The pierced disc 13.1 associated with the body connection is preferably designed as a toothed disc. The head 13.1, 14.1 of the spacer element 13, 14 or the pierced disc 13.1, 14.1 is welded to the upper side of the shell element 4.1. Preferably, this weld 16, 17 is implemented as a substantially circumferential weld 16, 17 along the circumference of the pierced disc 14.1 or toothed disc 13.1.

Figure 2:
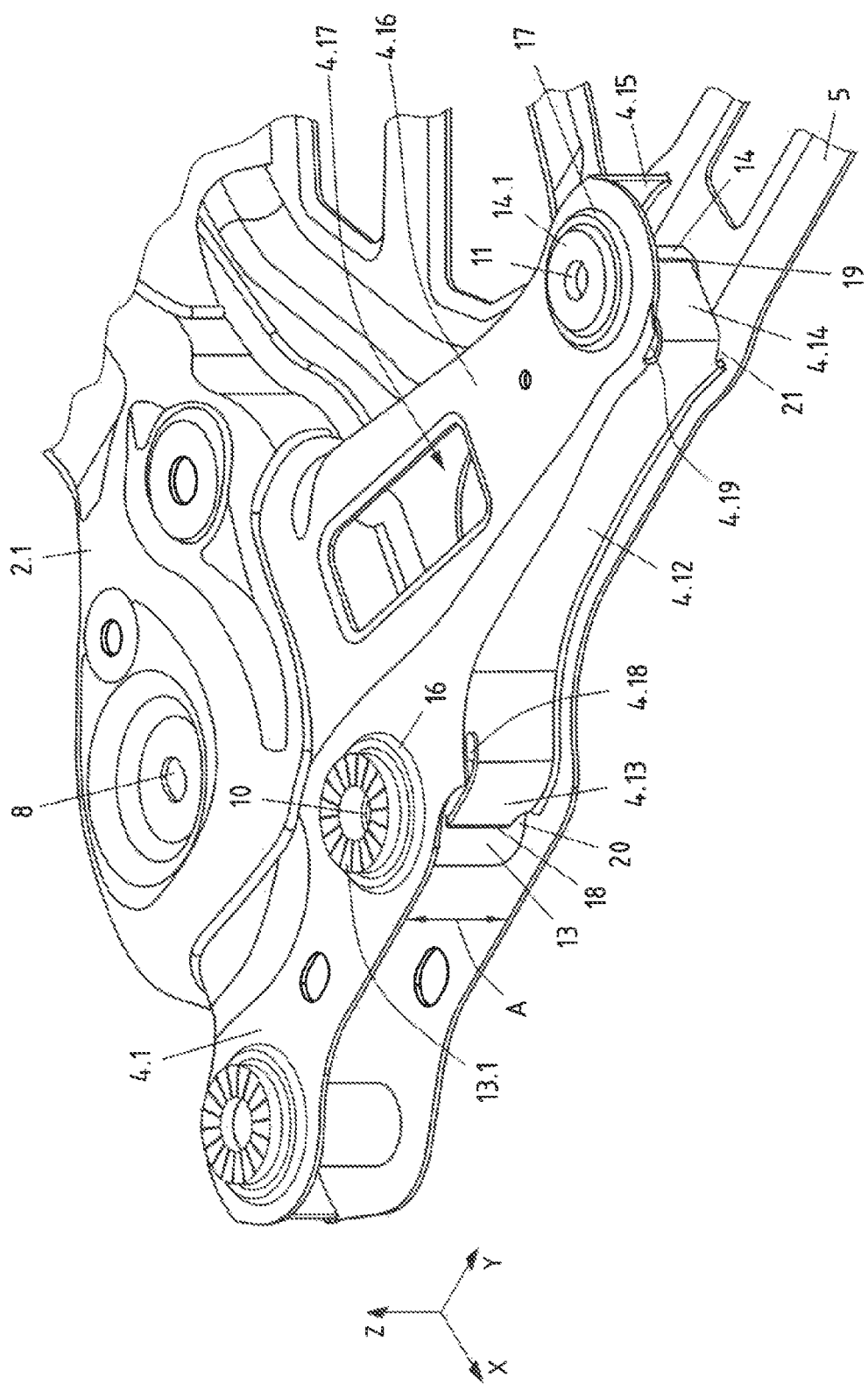
FIG. 2 a partial section of the subframe from FIG. 1, in an enlarged perspective view.

Furthermore, FIGS. 1 and 2 show that at least one of the shell elements, preferably the upper shell 4.1, has a side wall 4.12 which is welded to the other shell element 5 as an outer wall of the subframe 1. According to the invention, the side wall 4.12 has at least one tab 4.13, 4.14 which is welded to one of the spacer elements 13, 14. This welded joint 18, 19, which is preferably designed as a substantially axial weld seam 18, 19 along the bushing-like or sleeve-like spacer element 13, 14, creates an additional load path in the direction of the longitudinal center axis of the spacer element 13, 14. The tab 4.13, 4.14 is thereby preferably formed integrally with the side wall 4.12 of the relevant shell element 4.1.

The shell element (upper shell) 4.1 has a further side wall 4.15 which is integrally connected to the side wall 4.12 having the tab(s) 4.13, 4.14 via a web 4.16 (cf. FIG. 2). The two side walls 4.12, 4.15 define with the web 4.16 a shell section which is U-shaped in cross-section. The web 4.16 connecting the side walls 4.12, 4.15 has a window-like recess 4.17. The recess 4.17 has a clear size that is larger than the outer side surface of the tab 4.13 or 4.14. For example, the clear size of the recess 4.17 is at least 1.5 times, preferably at least 2 times, the outer side surface of the tab 4.13 or 4.14.

The tab 4.13, 4.14 is bent inwardly relative to an outer surface or tangential plane defined by the side wall 4.12 in the direction of the spacer element 13 or 14 welded thereto. The tab 4.13, 4.14 merges into the side wall 4.12 via a bending region, wherein at least one free cut 4.18, 4.19 is formed in the side wall 4.12 or on the tab 13, 14 and extends into the side wall 4.12 beyond the bending region. Furthermore, the spacer element 13, 14 and the tab 4.13, 4.14 welded thereto are arranged at an oblique angle to one another.

The tab 4.13, 4.14 is preferably welded to the respective spacer element 13, 14 by a weld seam 18, 19, preferably a fillet weld, extending substantially parallel to the longitudinal central axis of the bushing-like or sleeve-like spacer element 13, 14. The longitudinal center axis of the spacer element 13, 14 preferably runs essentially parallel to the vertical axis (z-axis) of the subframe 1 in the assembled state of the subframe 1.

Figure 3:
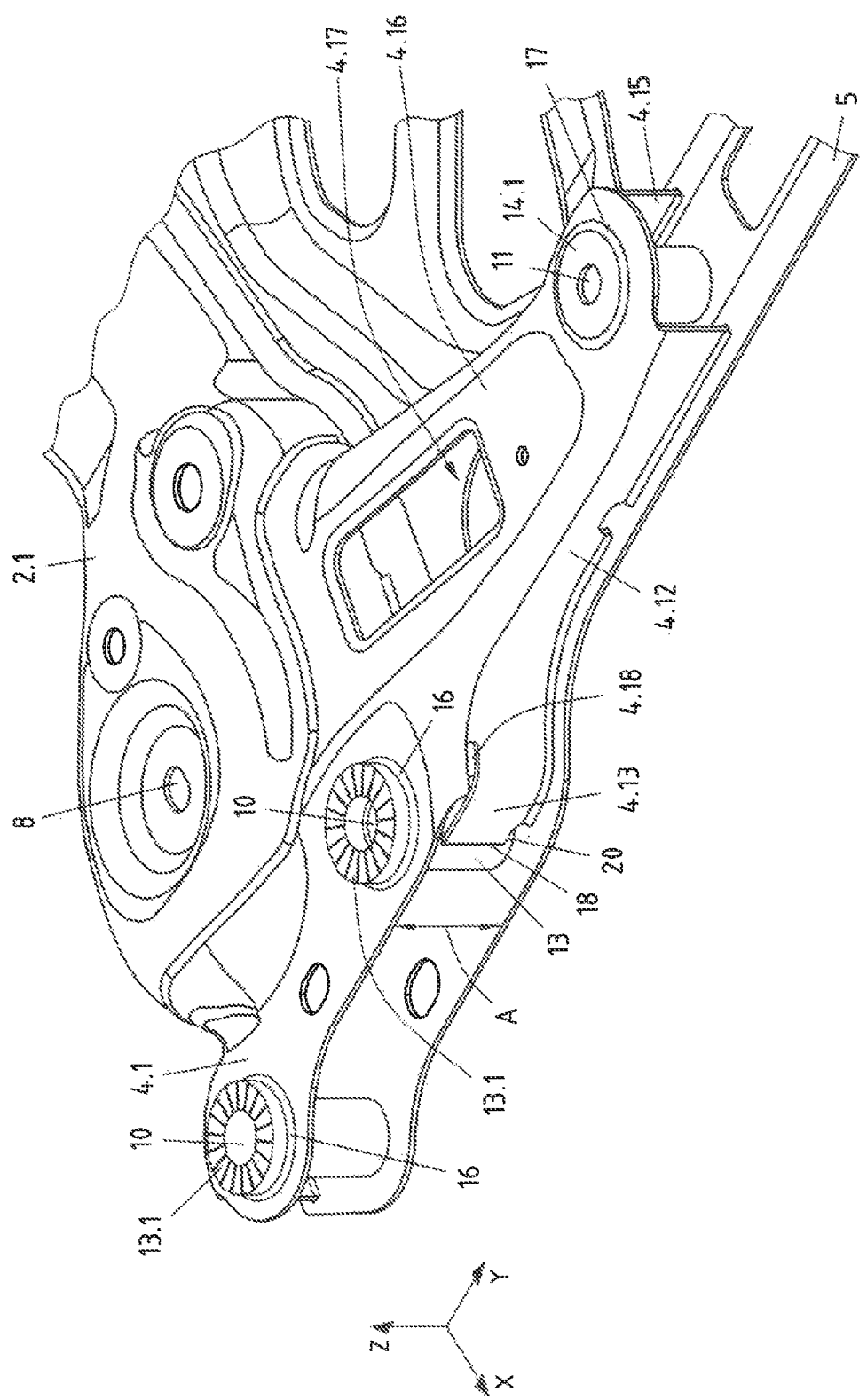
FIG. 3 a partial section of a subframe for a vehicle, in particular an electric vehicle, similar to the partial section in FIG. 2, but according to a further embodiment, in a perspective view.

The length of the weld seam 18, 19 between lug 4.13, 4.14 and spacer element 13, 14 is dimensioned such that the weld seam 18 or 19 extends over an axial length of the spacer element 13, 14 which lies, for example, in the range from 50 to 95%, preferably in the range from 60 to 90%, of the distance A of the shell elements 4.1 and 5 from one another measured at the spacer element 13, 14 (cf. FIGS. 2 and 3).

In the embodiment example shown in FIGS. 1 and 2, the subframe 1 has at least two bushing-like or sleeve-like spacer elements 13, 14, one of the spacer elements (13) being intended for the insertion of a fastening bolt, preferably a screw bolt, for body connection, while another of the spacer elements (14) is intended for the insertion of a fastening bolt, preferably a screw bolt, for component connection, for example a transverse bridge connection or a transmission bridge connection. The outer side wall 4.12 of the upper shell 4.1 preferably has at least two tabs 4.13, 4.14, of which one tab (4.13) is welded to the spacer element 13 of the body connection and another of the tabs (4.14) is welded to the spacer element 14 of the component connection. These welded joints, which are preferably designed as essentially axial welds 18, 19 along the spacer elements 13, 14, create two additional load paths parallel to the longitudinal center axes of the spacer elements 13, 14.

Furthermore, it is shown that a recess 20, 21 is formed between the tab 4.13, 4.14 of the shell element 4.1 and the shell element 5, which recess extends to the end of the tab 4.13, 4.14 welded to the spacer element 13, 14. The recess 21 can extend from the end of the tab 4.14 welded to the spacer element 14 to the bending region of the tab 4.14 or beyond the bending region of the tab 4.14 into the side wall 4.12 of the shell element 4.1.

The embodiment example of the subframe 1 according to the invention shown in FIG. 3 differs from the example shown in FIGS. 1 and 2 in that the outer side wall 4.12 of the upper shell 4.1 has only a single tab 4.13 with which it is welded to one of the bushing-like or sleeve-like spacer elements 13, 14, preferably to the spacer element 13 of the body connection. In this case, only one additional load path is implemented through the weld 18 in the direction of the longitudinal center axis of the relevant spacer element 13, whereas in the embodiment example shown in FIGS. 1 and 2, two additional load paths are implemented through the welds 18, 19 in the direction of the longitudinal center axes of the spacer elements 13, 14.

The embodiment of the invention is not limited to the examples shown in the drawing. Rather, the invention includes further embodiments that make use of the invention disclosed in the appended claims even in a design that differs from the examples shown. For example, it is also possible for both the upper shell and the lower shell to each have a side wall as the outer wall of the subframe, the side wall of the upper shell being welded to the lower shell and the side wall of the lower shell being welded to the upper shell. In this context, it is further possible for both side walls to have a tab, wherein both tabs can be welded to one, in particular the same, spacer element.

The invention claimed is:

1. A subframe for a vehicle, the subframe comprising:
a first shell element and a second shell element which is rigidly connected to the first shell element and defines a cavity therewith, at least one of the shell elements having a side wall which, as an outer wall of the subframe, is connected to the other shell element or to another of the shell elements in a materially bonded manner; and
at least one sleeve-shaped spacer element for the insertion of a fastening bolt for connecting to a body or component, wherein
the spacer element being arranged at one of its ends at a through-hole of the first shell element and extending inside the cavity in the direction of a through-hole of the second shell element, wherein the side wall of the shell element has at least one tab which is welded to the spacer element, wherein the at least one tab is formed integrally with the side wall of the shell element.

2. The subframe according to claim 1, wherein the shell element having the tab is an upper shell of the subframe.

3. The subframe according to claim 1, wherein the shell element having the tab has a further side wall which is integrally connected via a web to the side wall having the tab, the two side walls defining with the web a shell section which is U-shaped in cross section.

4. The subframe according to claim 3, wherein the web of the shell element connecting the side walls to one another has a recess, the recess having a clear size which is larger than the outer side surface of the tab, and the clear size of the recess being at least 1.5 or 2.0 times the outer side surface of the tab.

5. The subframe according to claim 1, wherein the subframe has at least two sleeve-shaped spacer elements, one of the spacer elements being intended for the insertion of a fastening bolt for a body connection, while another of the spacer elements is intended for the insertion of another fastening bolt for a component connection, and the side wall of the shell element has at least two tabs, of which one tab is welded to the spacer element of the body connection and another of the tabs is welded to the spacer element of the component connection.

6. The subframe according to claim 5, wherein the respective tab is welded to the respective spacer element by a weld seam running essentially parallel to a longitudinal central axis of the spacer element, the longitudinal central axis of the spacer element running essentially parallel to the vertical axis of the subframe in the assembled state of the subframe.

7. The subframe according to claim 6, wherein the weld seam between the tab and the spacer element extends over an axial length of the spacer element which is in the range from 20 to 95% of the distance of the shell elements from each another measured at the spacer element.

8. The subframe according to claim 1, wherein the spacer element and the tab welded thereto are arranged at an oblique joint to one another.

9. The subframe according to claim 1, wherein the at least one spacer element is connected on at least one of its ends or front faces to at least one of the shell elements by a plug-in connection or clamp connection and/or by a welded connection.

10. The subframe according to claim 1, wherein the tab is bent inwardly relative to an outer surface or tangential plane defined by the side wall in the direction of the spacer element welded thereto.

11. The subframe according to claim 1, wherein the tab merges into the side wall via a bending region, at least one free cut being present in the side wall and/or on the tab and extending into the side wall beyond the bending region.

12. The subframe according to claim 11, wherein a recess is formed between the tab of the one shell element and the other shell element, which recess extends up to the end of the tab, wherein the recess extends from the end of the tab welded to the spacer element to the bending region of the tab or beyond the bending region of the tab into the side wall.

13. The subframe according to claim 1, wherein the spacer element has a head of enlarged diameter in the form of a perforated disc the head being formed integrally with the spacer element.

14. The subframe according to claim 1, wherein the shell elements are made of sheet metal.

* * * * *